United States Patent [19]

Okuyama et al.

[11] Patent Number: 5,677,701
[45] Date of Patent: Oct. 14, 1997

[54] HEAD-UP DISPLAYING DEVICE FOR A VEHICLE

[75] Inventors: Hideki Okuyama, Obu; Naohito Kanamori, Yokkaichi, both of Japan

[73] Assignee: Nippondenso Co., Ltd., Kariya, Japan

[21] Appl. No.: 386,151

[22] Filed: Feb. 9, 1995

[51] Int. Cl.$^6$ ................................................. G02B 27/01
[52] U.S. Cl. .................... 345/7; 359/13; 359/630; 359/632
[58] Field of Search ............... 345/7, 2; 353/13, 353/14, 28, 29; 307/9.1, 10.1; 359/1, 13, 14, 15, 19, 22, 24, 630–633, 844, 859; 248/349.1, 346.1, 225.11, 229.16, 229.26

[56] References Cited

U.S. PATENT DOCUMENTS

| | | | |
|---|---|---|---|
| 4,566,664 | 1/1986 | Donald | 248/349.1 |
| 4,635,033 | 1/1987 | Inukai et al. | 353/14 |
| 4,892,369 | 1/1990 | Moss | 359/13 |
| 5,028,119 | 7/1991 | Hegg et al. | 345/7 X |
| 5,028,912 | 7/1991 | Iino | 345/7 |
| 5,144,459 | 9/1992 | Felske et al. | 359/13 |
| 5,214,413 | 5/1993 | Okabayashi et al. | 345/7 X |
| 5,237,455 | 8/1993 | Bordo et al. | 359/632 |
| 5,293,513 | 3/1994 | Umezu et al. | 307/10.1 |
| 5,313,317 | 5/1994 | Saburi et al. | 359/13 |

FOREIGN PATENT DOCUMENTS

| | | |
|---|---|---|
| 2675088 | 10/1992 | France . |
| 3532120 | 3/1987 | Germany . |
| 62-76032 | 5/1987 | Japan . |
| 62-137236 | 6/1987 | Japan . |
| 3-042695 | 2/1991 | Japan . |
| 3-91233 | 9/1991 | Japan . |
| 5-113742 | 5/1993 | Japan . |
| 5-49489 | 6/1993 | Japan . |

*Primary Examiner*—Raymond J. Bayerl
*Assistant Examiner*—Seth D. Vail
*Attorney, Agent, or Firm*—Cushman, Darby & Cushman IP Group of Pillsbury Madison & Sutro LLP

[57] ABSTRACT

All components and parts of a head-up displaying device are formed in a unit and secured to a dashboard or a rear panel of a vehicle. The displaying device has a case composed of a base member, a bottom plate and a cover. The base member is secured to the dashboard or the rear panel and forms a turntable with the bottom plate. An image projection unit, a control unit and a reflecting member are housed in the case, and a foldable flat combiner is pivotally secured to the cover of the case. A shade member is formed on the cover to prevent the image projection unit from coming into the driver's line of sight. The combiner is held by a holder which forms a hinge using clips secured to the case and shafts formed on the sides of the holder so that the inclination angle of the combiner may be adjusted. The combiner encloses a reflection hologram and an aspherical concave lens formed on the reflection hologram with glass panes or transparent plates made of resinous material which are covered with anti-reflection coatings.

18 Claims, 4 Drawing Sheets

HEAD-UP DISPLAYING DEVICE FOR A VEHICLE

CROSS REFERENCE TO THE RELATED APPLICATION

The present application is based on and claims the priority from Japanese patent application No. Hei 6-90054 filed on Apr. 27, 1994, the content of which is incorporated herein by reference.

BACKGROUND OF THE INVENTION

1. Field of the Invention

The present invention is related to a head-up displaying device for a vehicle.

2. Description of the Prior Art

A conventional head-up display for a vehicle which is used to display vehicle speed or the like is schematically shown in FIG. 8. The head-up display according to the prior art comprises an image displaying unit 100 which includes an image projection unit 5 and a mirror (optical path) 7 therein. The image displaying unit 100 is installed inside a dashboard 2 of the vehicle and a combiner (reflecting member) 8 which is vapor-deposited on an inner surface of a windshield 200 to focus an image 17 ahead of the windshield 200.

However, such a conventional head-up displaying device for a vehicle has a separate image projection unit 100 and a separate combiner 8 and they must be separately installed in a vehicle. Therefore, such installation brings about a considerable increase in time-consuming work, resulting in high cost and difficulty of installation.

SUMMARY OF THE INVENTION

Therefore, the primary object of the present invention is to provide a head-up displaying device for a vehicle which solves the above problems and can be installed more easily than prior art devices.

Another object of the present invention is to provide a head-up displaying device in which a projecting unit, a reflecting member and a combiner are integrally secured to a suitable portion of a vehicle, and hence, the device may be formed as a unit.

Another object of the present invention is to provide a head-up displaying device for a vehicle in which the combiner is foldable so that the device may be made compact.

Still another object of the present invention is to provide a head-up displaying device for a vehicle in which the combiner may swing to adjust the position of the image as seen by the driver in the vertical direction.

A further object of the present invention is to provide a head-up displaying device for a vehicle in which the combiner is rotatable to adjust the position of the image as seen by the driver in the horizontal direction.

A still further object of the present invention is to provide a head-up displaying device for a vehicle in which the combiner includes a thin reflection hologram sheet enhancing the reflection efficiency of the device at a specific wavelength.

A still further object of the present invention is to provide a head-up displaying device for a vehicle in which the aforementioned hologram has an aspherical concave lens disposed thereon to magnify the image viewed by the driver.

A further object of the present invention is to provide a head-up displaying device for a vehicle in which the combiner includes an anti-reflection coating disposed on at least one side thereof to reduce undesired reflection and to provide a sharp image without double images.

A still further object of the present invention is to provide a head-up displaying device for a vehicle in which an optical sensor for sensing the ambient light level and a controller automatically dimming the head-up display in response to the ambient light level are further provided to enhance visibility.

Still another object of the present invention is to provide a head-up displaying device for a vehicle in which a main case housing the device includes a shade member to prevent the image projection unit from coming into the users field of vision.

Still further object of the present invention is to provide a head-up displaying device for a vehicle in which a concave tray portion is formed at the upper surface of the device.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The preferred embodiments according to the present invention will be described as follows with reference to the appended drawings.

Figure 1:
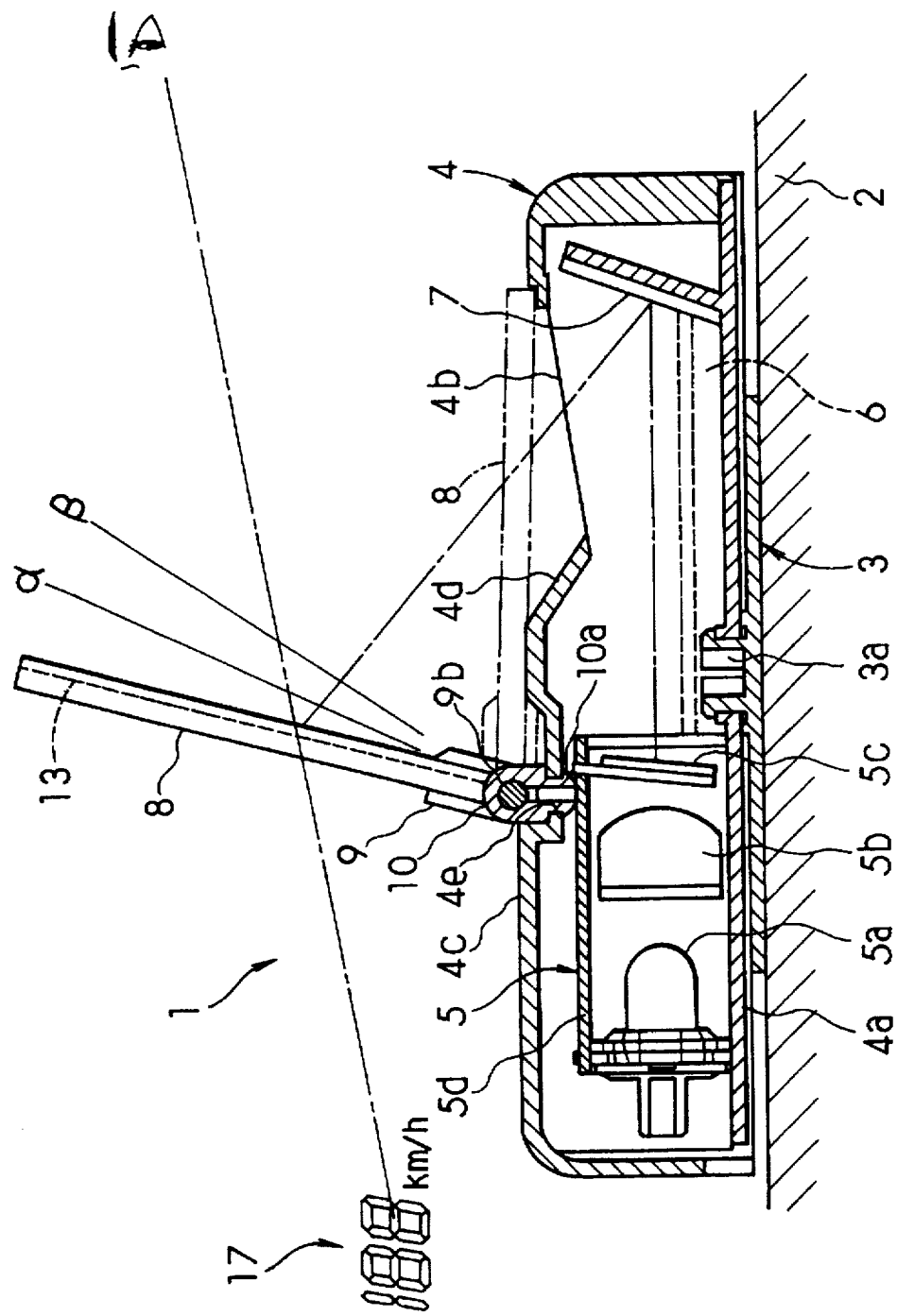
FIG. 1 is a side cross-sectional view of a head-up displaying device according to the first embodiment of the present invention.

As shown in FIG. 1, a head-up displaying device 1 includes a base member 3 formed with a stem 3a and secured to a dashboard 2 of a vehicle close to an instrument panel (not shown), a main case 4 which is formed with a bottom plate 4a rotatably carried around the stem 3a of base member 3 and which houses an image projection unit 5, a control unit 6 and a reflecting member (mirror) 7 therein. A flat combiner 8 is foldably mounted on the upper portion of the main case 4. The base member 3 and the bottom plate 4a form a turn table rotatable horizontally with respect to the dashboard 2. The main case 4 has a cover 4c on which an opening 4b, a couple of openings 4e and a shade member 4d are formed. The shade member 4d blocks the image projection unit 5 housed in the main case 4 from the driver's line of sight.

Image projection unit 5 is composed of a light source 5a, an optical lens 5b, a transmissive liquid crystal panel 5c and a case 5d to house these components. The case 5d is secured to the bottom plate 4a of the main case 4. The control unit 6 is secured to the bottom plate 4a of the main case 4.

Figure 2:
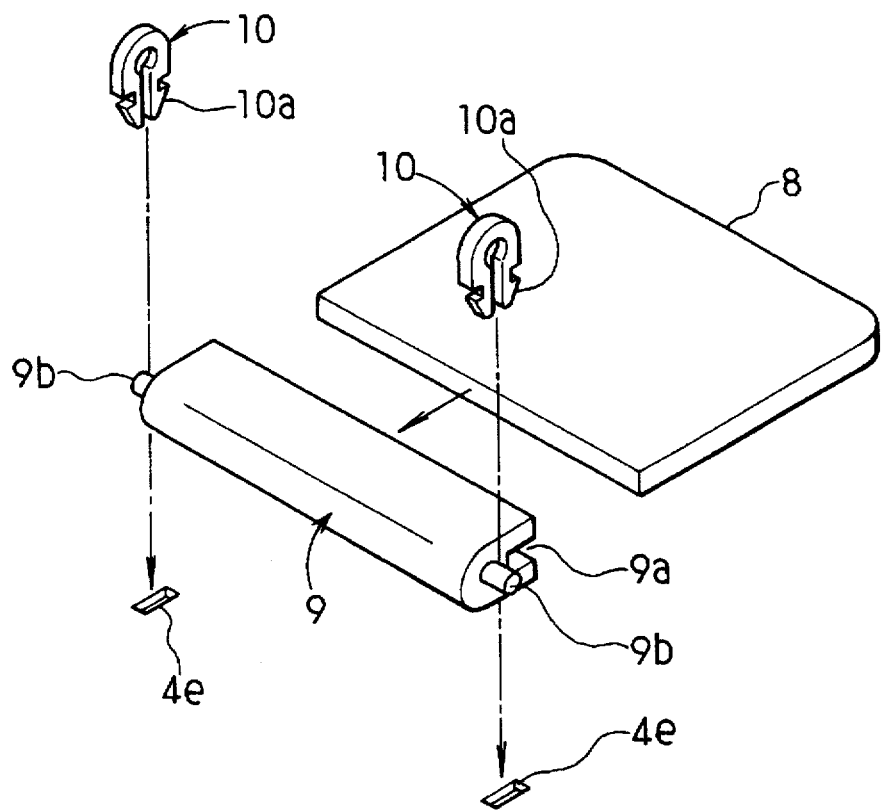
FIG. 2 is an exploded-perspective view illustrating the connecting structure of a combiner and a main case of the first embodiment.

The reflecting member 7 is secured to the bottom plate 4a so that it faces the image projection unit 5, and is inclined relative to the bottom plate 4a at such an angle that an image beam may be reflected from the image projection unit 5 through the opening 4b to the surface of the combiner 8. As shown more clearly in FIG. 2, the combiner 8 is held by a holder 9 at its lower end and is fitted into a groove 9a formed in the holder 9 and extending along the longitudinal direction thereof. The holder 9 rotates around a couple of shafts 9b formed on its sides and is secured to the cover 4c by a couple of clips 10. Each clip 10 has a pair of hooks 10a which hold a corresponding shaft 9b therebetween and is fitted into a corresponding hole 4e in cover 4c. As a result, the holder 9 functions as a hinge so that the combiner 8 may be raised or lowered as shown by the ghost view in FIG. 1. When the combiner 8 is lowered, it covers the opening 4b to protect the interior of the displaying device 1 from dust, water and the like. The inclination angle of the combiner 8 may be adjusted as shown by lines α and β in FIG. 1 using the frictional retaining force of the clips 10 to catch the shafts 9b of the holder 9.

Figure 3:
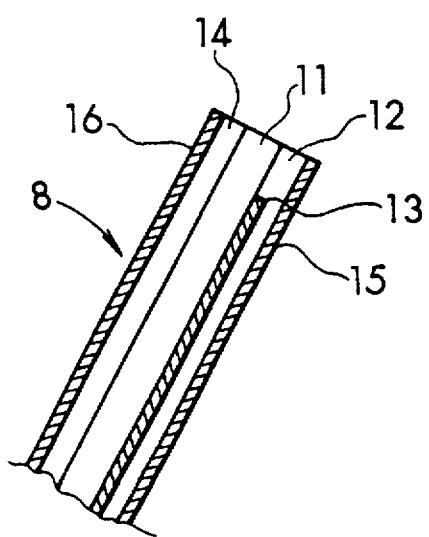
FIG. 3 is a cross-sectional side view of the combiner shown in FIG. 2.

The combiner 8 has a thin reflection hologram 13 which is formed with an aspherical concave lens (not shown) disposed thereon and is enclosed between glass panes 11 and 12 as shown in FIG. 3. Anti-reflection coatings 15 and 16 are also formed to cover the exposed surfaces of the combiner 8.

When head-up displaying device 1 described above is being used, the combiner 8 is first raised from the folded position. A light beam is emitted from light source 5a and passes through the optical lens 5b and the liquid crystal panel 5c which is controlled by control unit 6 to form an image pattern thereon. The light beam is then formed into a displaying image beam and projected out of the image projection unit 5 to the reflecting member 7, which reflects the displaying image beam to direct it to one side of the combiner 8 through the opening 4b. Then, the image is magnified by the aspherical lens formed on the combiner 8 into an image magnified several times over to focus a virtual image 17 in front of the other side of the combiner 8. Since the image is magnified several times by the aspherical lens, a large-sized image may be obtained with a short optical length, which enables integration (unification) of the components of the device 1. Since the combiner 8 has anti-reflection coatings 15 and 16 formed thereon, light which is reflected by the sides of glass panes 12 and 14 may be reduced. Thus, the image light beam coming into the combiner 8 is substantially reflected by the hologram 13 so that the virtual image 17 is sharp without being doubled and also so that the driver can maintain an unobstructed view through the combiner 8. Since the combiner 8 has a thin sheet hologram enclosed therein, the reflection efficiency of the device 1 at its specific display wavelength may be enhanced.

In case the driver wants to change the position of the image 17, it may be adjusted in the horizontal direction merely by rotating the main case 4 around the stem 3a of the base member 3 to an appropriate angle. The vertical position of the image 17 may also be adjusted by swinging the combiner 8 around the shafts 9b of the holder 9 to form an appropriate inclination angle. As a result, about 99% of the driver's field of vision may be preserved.

The combiner 8 may be composed of resinous transparent plates 11, 12 and 14 such as acrylic plates instead of the glass panes. In this structure, the shafts 9b may be integrally formed on the sides of the resinous plates and, therefore, the combiner 8 and the holder 9 may be integrated into a unit, resulting in a reduction in the number of parts and the manufacturing cost and also resulting in an enhancing of the device's safety level.

The liquid crystal panel 5c may be replaced by a self-illuminating image formation device such as a vacuum fluorescent display (VFD) or an electroluminescent panel (EL), in which case the light source 5a may be eliminated if appropriate.

Figure 4:
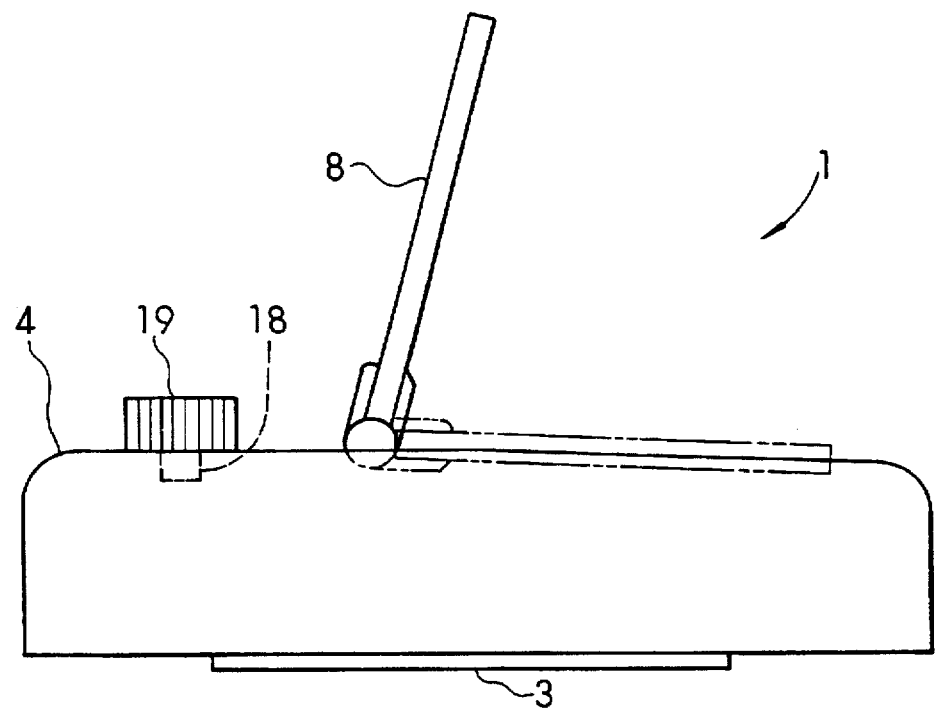
FIG. 4 is a side view of a head-up displaying device for a vehicle according to the second embodiment of the present invention.
Figure 5:
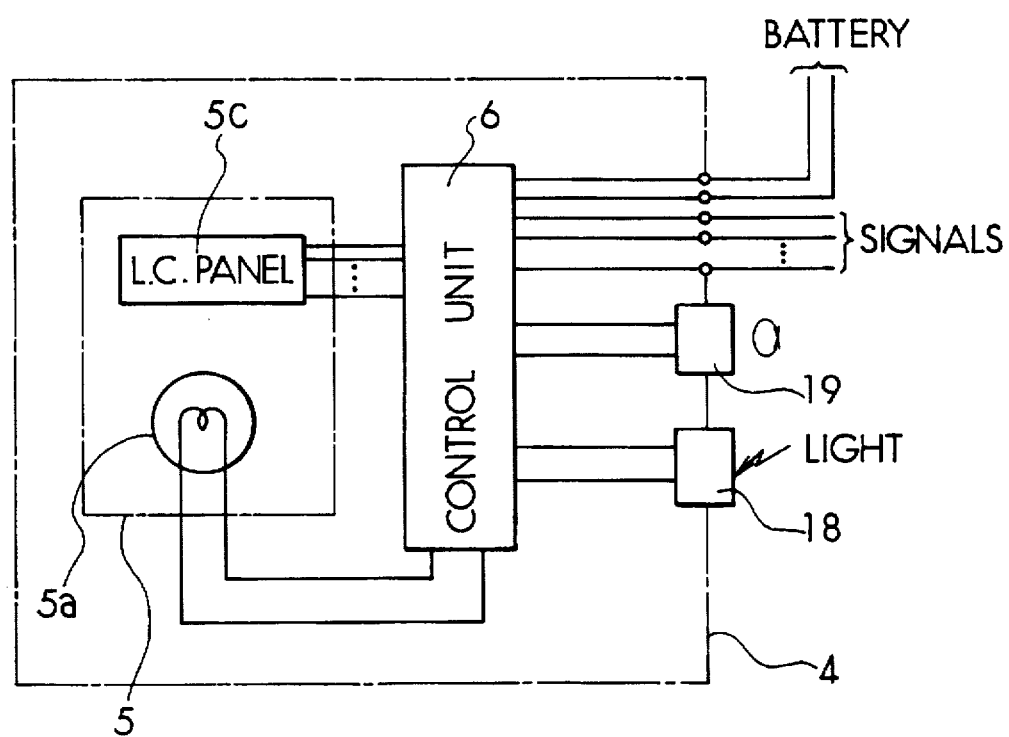
FIG. 5 is a schematic circuit diagram of the above embodiment.

FIGS. 4 and 5 illustrate a structure of a head-up displaying device 1 for a vehicle according to the second embodiment of the invention, in which the main case 4 of the first embodiment further contains therein an optical sensor 18 and a dimmer knob 19 to provide control unit 6 with automatic dimmer control and manual dimmer control. Reference numerals in the figures for this embodiment generally used correspond to those in the figures of the first embodiment. The optical sensor 18 generates a signal in response to the ambient light level in the vicinity of the display image 17 and the dimmer knob 19 generates a signal for the control unit 6 to change the contrast or brightness of the display image 17 as desired by the driver. As a matter of course, the control unit 6 is powered by a battery and controls the liquid crystal panel 5c to form image patterns in response to signals sent thereto.

In this embodiment, the brightness adjustment may be made automatically in response to the ambient light conditions and, thereby, optimal visibility of the image is always assured. Further, a driver may manipulate the dimmer knob 19 as desired to adjust a desired brightness or contrast of the display image 17.

Figure 6:
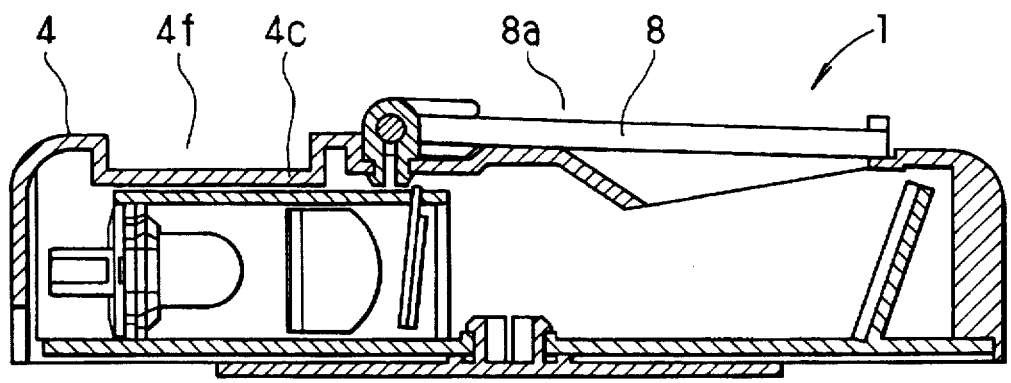
FIG. 6 is a cross-sectional side view of a head-up displaying device for a vehicle according to the third embodiment of the present invention.

A third embodiment of the present invention is illustrated in FIG. 6, in which the main case 4 of the first embodiment is formed with concave portions 4f and 8a on its cover 4c and on the back of the combiner 8, respectively. Such concave portions may be used for trays.

Figure 7:
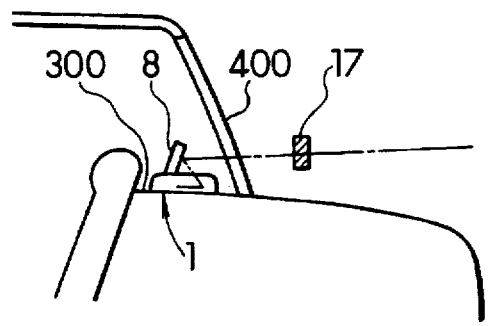
FIG. 7 is a schematic view illustrating installation of a head-up displaying device for a vehicle according to the forth embodiment of the present invention.
Figure 8:
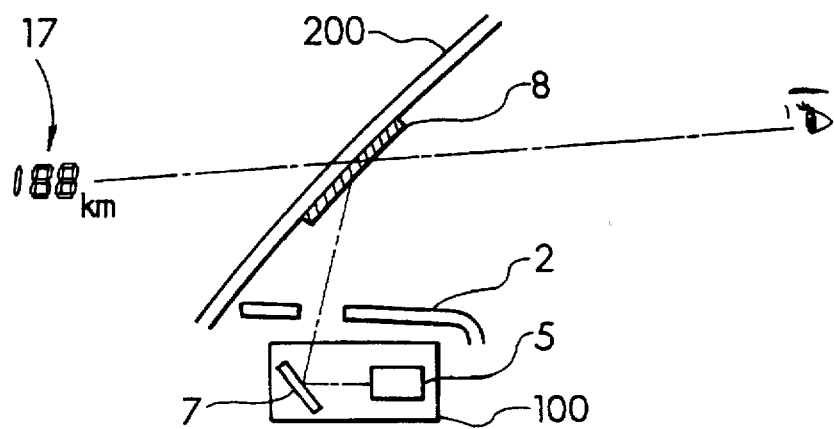
FIG. 8 is a schematic view illustrating a conventional head-up displaying device.

A fourth embodiment of the head-up displaying device 1 according to the present invention is mounted on a rear panel 300 of the vehicle as illustrated in FIG. 7. This embodiment displays such information as brake signals or turn signals to other vehicles or persons behind the vehicle. For this purpose, the combiner 8 of the first embodiment additionally has a red colored member on its hologram 13 onto which light beams are projected in the same manner as in the first embodiment, so that a red three-dimensional image may come to the front of the combiner 8 and be projected through the rear windshield 400. Thus, the device 1 may be used for a high-position-mounted brake light.

What is claimed is:

1. A head-up displaying device for a vehicle comprising:
   a case secured to a vehicle interior and having an opening;
   a projecting means disposed in said case for projecting a display image;
   a reflecting member, disposed in said case and facing said projection unit, for directing said display image through said opening toward a prescribed spot outside said case;
   a combiner secured to said case to receive said display image at said spot for focussing said display image into a virtual image; and
   a hinge member connecting said case and said combiner so that said combiner may be inclined;
   said hinge member comprises a holder to hold said combiner, said holder having shafts on both sides thereof and U-shaped clips having open ends fitted into said case for securing said shafts therein with such a frictional force as to hold said combiner at a given inclination angle.

2. A head-up displaying device according to claim 1 further comprising:

a turning member disposed between said case and said vehicle interior for rotatably connecting said case with said vehicle interior to adjust said virtual image in a horizontal direction.

3. A head-up displaying device for a vehicle according to claim 1, wherein said combiner comprises a reflection hologram assembly.

4. A head-up displaying device for a vehicle according to claim 3, wherein said combiner further comprises two glass panes for covering said hologram assembly on opposite sides thereof and an anti-reflection coating formed on a side of at least one of said glass panes.

5. A head-up displaying device according to claim 1, wherein said case comprises a shade member formed adjacent to said opening on an upper portion of said case for preventing said image projection member from coming into a line of sight of a person viewing said virtual image.

6. A head-up displaying device for a vehicle according to claim 1, wherein said projecting means comprises a liquid crystal panel forming a prescribed image pattern and a light source, whereby a light beam emitted by said source and passing through said liquid crystal panel is projected as said display image.

7. A head-up displaying device for a vehicle comprising:

a case secured to a vehicle interior and having an opening;

a projecting means disposed in said case for projecting a display image;

a reflecting member, disposed in said case and facing said projection unit, for directing said display image through said opening toward a prescribed spot outside said case; and a combiner secured to said case to receive said display image at said spot for focussing said display image into a virtual image;

wherein said combiner comprises a reflection hologram assembly, and said hologram assembly comprises an aspherical concave lens formed on a surface of a reflection hologram for magnifying said virtual image.

8. A head-up displaying device for a vehicle according to claim 7 further comprising:

an optical sensor for sensing an ambient light level; and control means disposed in said case and connected to said optical sensor for automatically dimming said display image in response to an increase in the ambient light level sensed by said optical sensor.

9. A head-up displaying device comprising:

a case secured to a vehicle interior and having an opening;

a projecting means disposed in said case for projecting a display image;

a reflecting member, disposed in said case and facing said protection unit, for directing said display image through said opening toward a prescribed spot outside said case and;

a combiner secured to said case to receive said display image at said spot for focusing said display image into a virtual image, wherein said case further comprises a recess formed at an upper surface thereof for use as a tray member.

10. A head-up displaying device for a vehicle comprising:

a case rotatably mounted on a portion of a vehicle and having an opening;

a unit disposed in said case for projecting a display image to be displayed;

a reflecting member, disposed in said case and facing said projection unit, for directing said display image through said opening toward a prescribed spot outside said case; and combiner means, secured to said case, for receiving said display image at said spot, magnifying said display image and focussing the magnified image as a virtual image at a point outside said combiner means;

wherein said combiner means comprises a hologram with an aspherical concave lens formed thereon to magnify said display image received thereon.

11. A head-up displaying device for a vehicle according to claim 10, wherein said combiner means further comprises a hinge connected to said case for changing a vertical position of said virtual image.

12. A head-up displaying device for a vehicle according to claim 10, wherein said combiner means further comprises a hinge connected to said case to selectively position said combiner means to cover said opening.

13. A head-up displaying device for a vehicle according to claim 10, wherein said combiner means further comprises a pair of transparent plates covering said hologram on both sides and a anti-reflection coating formed on at least one of said transparent plates on a side of said at least one plate opposite said hologram.

14. A head-up displaying device according to claim 13, wherein said combiner means comprises a hinge connected to said case to selectively position said combiner means.

15. A head-up displaying device for a vehicle comprising:

a case rotatably mounted on a portion of a vehicle and having an opening;

a unit disposed in said case for projecting a display image to be displayed;

a reflecting member, disposed in said case and facing said projection unit, for directing said display image through said opening toward a prescribed spot outside case; and combiner means, secured to said case, for receiving said display image at said spot, magnifying said display image and focussing the magnified image as a virtual image at a point outside said combiner means;

wherein said combiner means further comprises a hinge connected to said case for changing a vertical position of said virtual image, and said hinge comprises a holder connected to said case which has two shafts formed on its ends and two U-shaped clips fitted in said case for holding corresponding shafts therein by a frictional retaining force.

16. A head-up displaying device for a vehicle comprising:

a case having an opening and being rotatably mounted on a front portion of a vehicle;

a unit disposed in said case for projecting a display image;

a reflecting member, disposed in said case and facing said projection unit, for directing said display image through said opening toward a prescribed spot outside said case; and combiner means secured to said case, for receiving said display image at said spot on a first side of said combiner means magnifying said display image and focusing the magnified image as a virtual image at a point on a second side of said combiner means opposite said first side;

wherein said combiner means comprises a hinge connected to said case to selectively position said combiner means to cover said opening, and said hinge comprises a holder connected to said case which has two shafts formed on its ends and two U-shaped clips fitted in said case for holding corresponding shafts therein by a frictional retaining force.

17. A head-up displaying device for a vehicle according to claim 16, wherein said combiner means further comprises a pair of transparent plates covering said hologram on both sides and an anti-reflection coating formed on at least one of said transparent plates on a side of said at least one plate opposite said hologram.

18. A head-up displaying device according to claim 16 further comprising:

a turning member disposed between said casing and said front portion of said vehicle for rotatably connecting said case with said front portion to adjust said virtual image in a horizontal direction.

* * * * *